United States Patent [19]
Austin et al.

[11] 3,886,418
[45] May 27, 1975

[54] SET POINT CONTROLLER

[75] Inventors: Dennis R. Austin; Wilbern W. McNease, both of Beaumont, Tex.

[73] Assignee: Mobil Oil Corporation, New York, N.Y.

[22] Filed: Nov. 5, 1973

[21] Appl. No.: 413,026

Related U.S. Application Data

[63] Continuation of Ser. No. 217,196, Jan. 12, 1972, abandoned.

[52] U.S. Cl. ............... 318/15; 318/696; 318/103; 235/150.1
[51] Int. Cl. ............................................. G05b 15/02
[58] Field of Search .......... 318/696, 599, 685, 102, 318/103, 15; 235/150.1; 338/116

[56] References Cited
UNITED STATES PATENTS

| | | | |
|---|---|---|---|
| 3,196,347 | 7/1965 | Moyano | 338/116 X |
| 3,416,054 | 12/1968 | Galles | 318/696 |
| 3,508,329 | 4/1970 | Elliott et al. | 338/143 X |
| 3,636,429 | 1/1972 | Jakubowski et al. | 318/685 |

OTHER PUBLICATIONS
"Receiver Synchronizing Circuit," IBM Technical Disclosure Bulletin; Vol. 7, No. 12, May, 1965, p. 1,185.

*Primary Examiner*—Eugene G. Botz
*Attorney, Agent, or Firm*—C. A. Huggett

[57] ABSTRACT

A set point controller includes an incremental step motor having a permanent magnet rotor, a permanent magnet stator and four motor windings. Selective energization of the windings causes incremental rotation of a motor shaft which is directly coupled to the shaft of a multiple turn potentiometer. The multiple turn potentiometer produces an analog set point signal as an output in response to rotation of the potentiometer shaft. Logic circuitry is connected to the motor windings to convert the digital input signal to signals which selectively energize the windings. The logic circuitry includes two bistable flip-flops which are switched in a raise sequence and a lower sequence by clock pulses which are synched to the frequency of the local line power.

The potentiometer is enclosed in a dust-free casing to prevent interference from dust and corrosion. A manual adjustment knob is connected through an idler gear to the potentiometer for manual adjustment.

2 Claims, 5 Drawing Figures

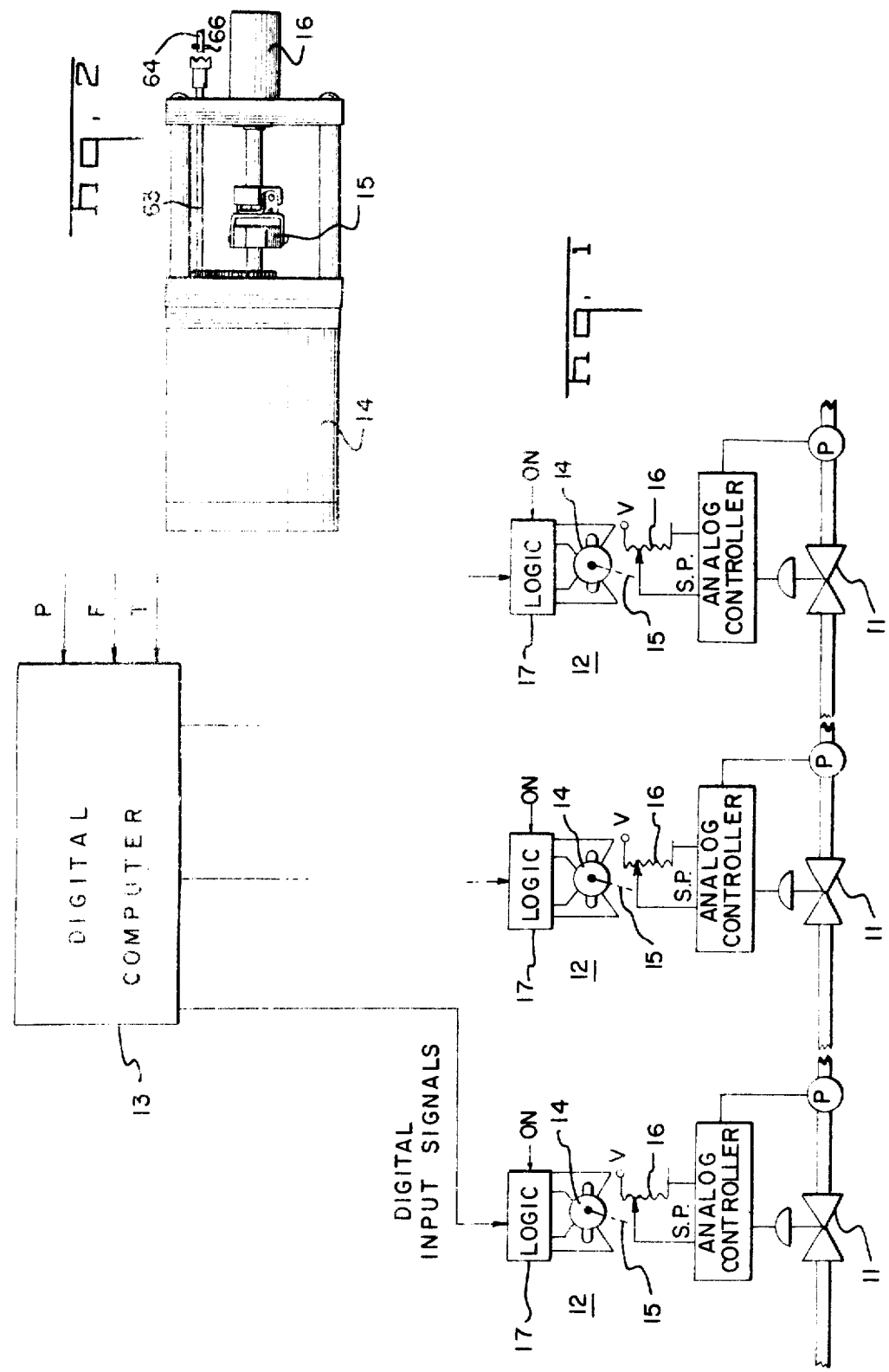

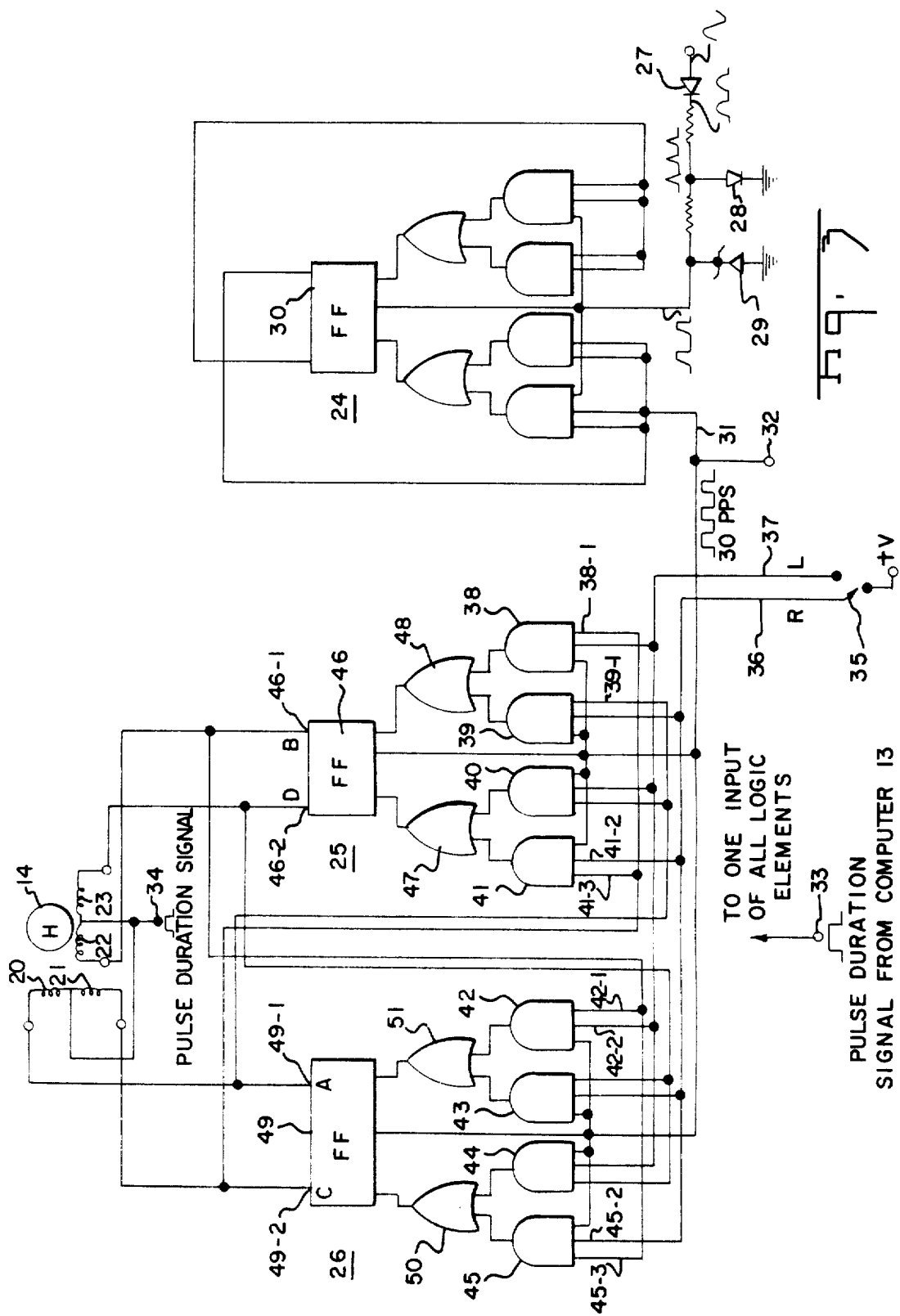

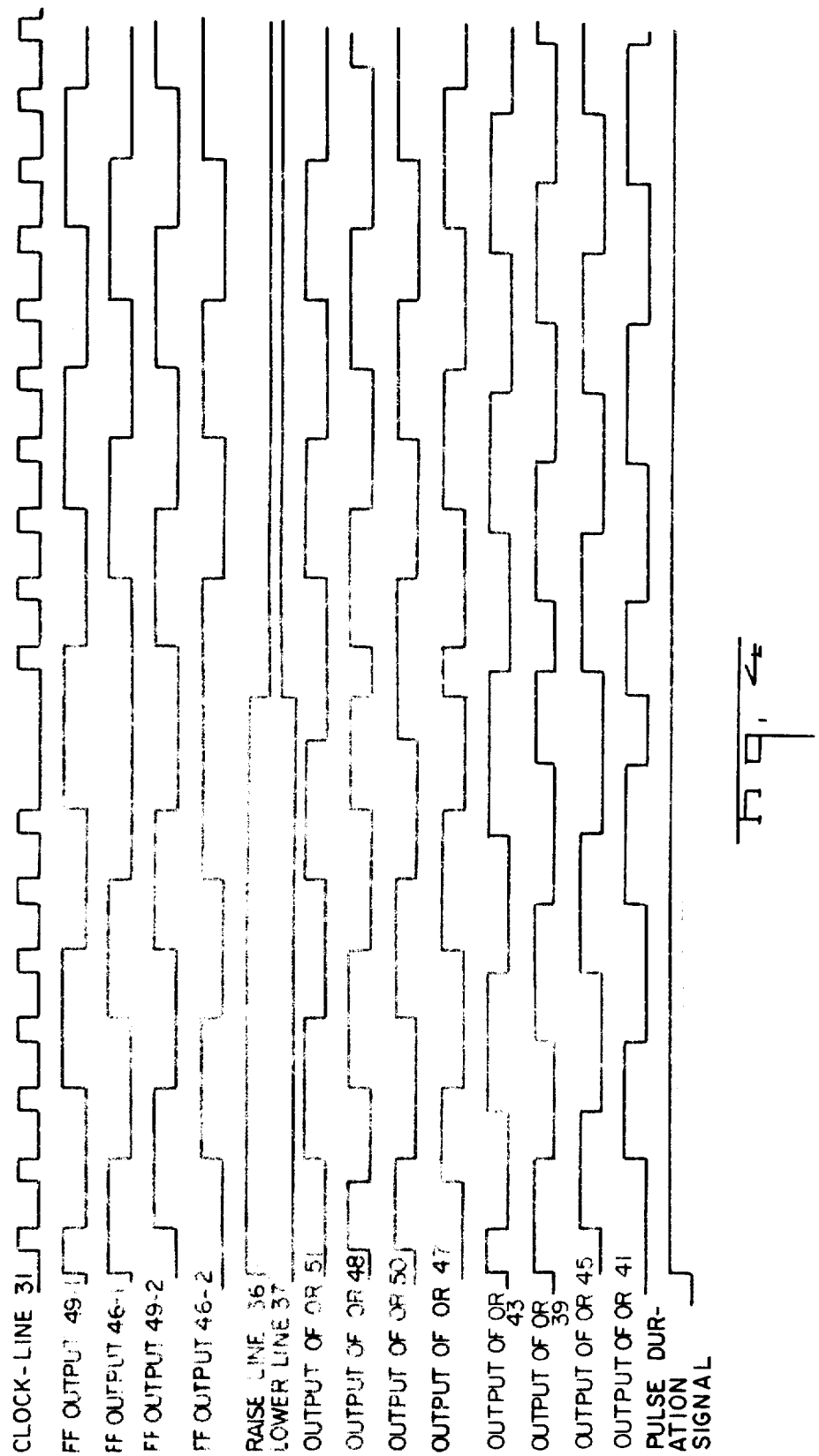

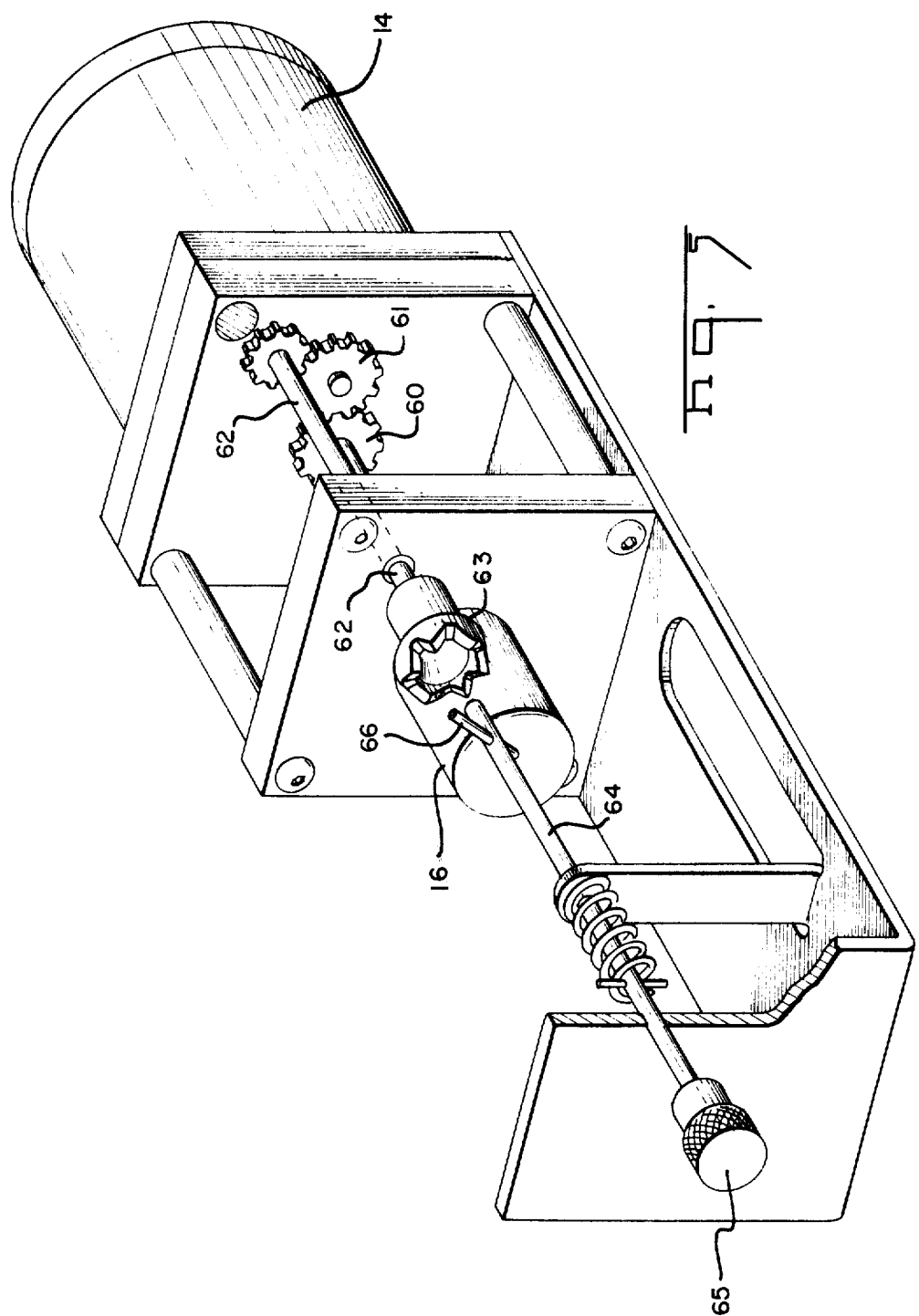

SET POINT CONTROLLER

This is a continuation of application Ser. No. 217,196, filed Jan. 12, 1972, now abandoned.

BACKGROUND OF THE INVENTION

This invention relates to controllers and more particularly to a set point controller which can be used in large processing systems such as oil refineries.

Large processing systems include a large number of control elements which control the flow, level, heat, and pressure in the processing system. For example, a refinery may commonly have over one hundred control elements which control valves and heaters in the processing system.

It has become common to provide a local analog control loop for each of these elements. The overall processing is controlled by a digital computer which periodically changes the set points in the local analog control loops. This type of control is often referred to as digital-analog control and it is described in U.S. Pat. No. 2,932,471 Exner et al. Such systems require a very accurate set point controller. The controller converts a digital signal from the digital computer into an analog voltage which is inserted in the local analog control loop.

The demands on these set point controllers are stringent. Often, the controllers are used in a corrosive atmosphere in which mechanical moving elements quickly deteriorate in performance. The set point controllers must be accurate and their accuracy must be repeatable over long periods of time. That is, they must be stable. Usually, set point controllers have provisions for changing the set point in both directions, i.e., raising it and lowering it. Both directions of change must exhibit the same accuracy.

Set point controllers utilizing a potentiometer are available. A motor rotates the shaft of the potentiometer in response to the digital input signal and the voltage across the potentiometer is the set point signal. This type of controller has the advantage of stability over long periods of time because the mechanical position of the wiper on the potentiometer is quite stable. One example of such a set point controller of this type is the Motorola model No. SP-A612 controller. These units have been built with gear linkages between the motor and the potentiometer and these linkages are particularly susceptible to a certain amount of play in the mechanical elements. This introduces hysteresis; that is, when the direction of control is reversed, an extra increment must be applied to take up the slack in the mechanical linkage before reversal in the set point is obtained. This is particularly a problem in set point controllers because these controllers normally operate with frequent reversals of direction about the control point. Each time there is a reversal in direction, the mechanical play in the linkages becomes a problem.

Another problem is that each of the set point controllers has its own local clock. The clocks of the different set point controllers may drift one with respect to another so that a given digital signal may produce a different change in set points depending upon the controller to which the signal is directed. In this controller a two-phase motor is controlled by two independent flip-flops. One flip-flop drives the raise mode and one drives the lower mode. Each flip-flop can be independently adjusted as to frequency. It is necessary to adjust the raise control and the lower control on each set point controller to try to obtain as uniform accuracy as possible. Where a large number of set point controllers are used in an installation, this is an almost impossible task.

Another problem with prior art set point controllers is that the potentiometer slide-wire is exposed and is subject to malfunction because dust or dirt particles get into the potentiometer slide-wire or the slide-wire becomes corroded. When corrosion or dust or other problems cause malfunction of a set point controller, two or three control loops may be rendered inoperative because there is interaction between the loops. In this event, the operator must manually set the set point in these control loops until an operative controller can again be put on line.

Another approach to set point controllers has been completely electronic. As an example, the General Electric set point controller makes use of an operational amplifier to convert the digital signal to the analog set point signal. While this approach obviates the disadvantages of the mechanical linkages, electronic controllers in general do have a drift stability problem. Over long periods of time they are not stable to the accuracy required in all processing control systems.

SUMMARY OF THE INVENTION

The set point controller of this invention is particularly suitable for use where extreme accuracy and high reliability are required. In order to meet these requirements, the set point controller includes an enclosed multiple turn potentiometer having a direct coupling to an incremental step motor. This motor is of the type which has a permanent magnet rotor and a permanent magnet stator so that it has a stable rest position. The very stable rest position of the motor, together with the direct linkage to the potentiometer, eliminates almost all the mechanical play in the controller.

In accordance with another important aspect of the invention all controllers operate on clock pulses which are synchronized to the local line frequency. This eliminates the requirement for adjustment between the various set point controllers and the system. Furthermore, the logic circuitry which selectively energizes the windings of the motor operates in both the raise and lower direction. This eliminates the separate raise and lower circuits which would otherwise have to be adjusted one with respect to the other.

In accordance with another important aspect of the invention the potentiometer is completely enclosed so that it is not subject to failure because of dust or corrosion.

In accordance with another important aspect of this invention the controller has a manual adjustment knob which can be depressed to engage an idler which normally moves with the potentiometer shaft during automatic operation.

The foregoing and other objects, features and advantages of the invention will be better understood from the following more detailed description, appended claims and drawings.

DESCRIPTION OF THE DRAWINGS

FIG. 1 shows a processing system which includes many set point controllers;

FIG. 2 is a view of the motor which is directly coupled to the potentiometer;

FIG. 3 is a logic diagram of the circuit which controls the motor;

FIG. 4 is a timing diagram; and

FIG. 5 shows the manual adjustment knob.

DESCRIPTION OF A PARTICULAR EMBODIMENT

Referring to FIG. 1, a typical processing system includes a number of control elements such as the valve 11. The positioning of these control elements is under the control of an analog controller which is connected in a local analog control loop. As shown in FIG. 1, the loop includes a measurement of pressure which is fed back through the analog controller. The set point for the analog controller is set by the set point controller 12 of this invention.

The set point controllers receive digital input signals from the digital computer 13. The digital computer 13 receives a number of measurements such as temperature, pressure and flow rate from the processing system. In response to these inputs it computes the changes in the set points of the various control elements.

As shown in FIGS. 1 and 2, each of the set point controllers includes an incremental step motor 14. Preferably this motor is of the type having a permanent magnet rotor, a permanent magnet stator and four motor windings. This type of motor is particularly advantageous because the rest position of the motor is very stable. There is no rotation of the motor shaft unless there is energization of the windings and energization causes a positive step increment. There is no play. One motor which is suitable for use is the MINIANGLE motor manufactured by Computer Devices Corp., Santa Fe Springs, Calif. This motor has four windings. Selective energization of these four windings causes incremental rotation of the motor shaft of 1.8° per increment.

A direct coupling 15 couples the motor shaft to the shaft of a multiple turn potentiometer 16. One potentiometer which is particularly suitable for use is the Faircon[R] type MF 78 wire wound 10 turn precision potentiometer manufactured by Fairchild Controls, San Diego, Calif. In the particular embodiment under consideration, a 24-volt input voltage applied across the potentiometer is converted to a set point output which has a range of 1–5 volts. This 4-volt output range is divided into two-thousand increments. The stepping motor has 200 increments of 1.8° each and the potentiometer has 10 complete turns for a full range of output. Therefore, there are 2,000 increments in the full range output.

Logic circuitry 17 converts the digital input signals to signals which selectively energize the four windings of the motor 14. This logic circuitry is shown in FIg. 3.

The logic circuitry of FIG. 3 is a particularly advantageous arrangement for selectively energizing the four windings 20–23 of the motor 14. The circuit includes only three integrated circuits. An integrated circuit 24 produces a 30 pulse per second clock. Integrated circuits 25 and 26 each include a bistable flip-flop which responds to the 30 pulses per second clock to selectively energize the windings 20–23.

Now consider the circuit of FIG. 3 in more detail. The 60 Hz line voltage is dropped to 24 volts A.C. which is applied to the diode 27. This converts the sine wave to a rectified 60 pulses per second. A snap diode 28 allows the voltage to go to 8 volts before the voltage is shortcircuited to ground. The 6 volt Zener diode 29 limits the voltage thereby squaring the pulses. Squared pulses are applied to the flip-flop 30 which is interconnected through the AND gates of the integrated circuit in such a manner that a 30 pulse per second train of square pulses is produced on the clock line 31. These clock pulses are synchronized to the frequency of the local line power. These clock pulses are applied to all of the logic elements in the integrated circuits 25 and 26.

Provision may be made for supplying clock pulses from an external source to the input terminal 32. In some embodiments it may be desirable to produce a train of pulses representing the change in the set point signal and this pulse train can be applied to the terminal 32. However, in the embodiment to be described, the signal from the digital computer is a pulse time duration signal representing the magnitude of the change in the set point. This signal is applied to the power input to all of the logic elements in the integrated circuits 25 and 26. This has been diagrammatically shown in FIG. 3 by the application of a pulse duration signal to the input terminal 33. The same pulse duration signal is applied to the input terminal 34 so that the windings of the motor 14 can be energized only during the time that the pulse duration signal from the digital computer is "up." Because of this, during the time that the pulse duration signal is up, the logic circuitry of the integrated circuits 25 and 26 will count clock pulses and the motor 14 will step in one direction or the other in response to selective energization of the windings 20–23.

The direction of the stepping of the motor is controlled by a signal from the digital computer. This is diagrammatically shown in FIG. 3 by the single-pole double-throw switch 35 which selectively applies an enabling voltage to either the raise line 36 or to the lower line 37. The raise signal on line 36 is connected to the inputs of AND gates 39, 41, 43 and 45. The lower signal on line 37 is connected to the inputs of AND gates 38, 40, 42 and 44. The raise and lower signals switch the logic circuitry between a raise counting sequence and a lower counting sequence.

Integrated circuit 25 includes a toggle type flip-flop 46. Flip-flops of this type include two enabling inputs which are respectively connected to the outputs of OR gates 47 and 48. The clock pulses are applied to the toggle input. Successive clock pulses will set the flip-flop 46 to one state or the other depending upon which of the two enabling inputs is up.

Similarly, integrated circuit 26 includes a toggle type flip-flop 49 and two OR gates 50 and 51.

The outputs of flip-flops 46 and 49 are connected to the inputs of AND gates 38–45 to control the switching sequence. As an example of the switching sequence, consider the following operation.

Upon application of voltage to the Flip-Flops 25 and 26, they assume a "set" state such that outputs 46-1 and 49-1 are in the high state. This will energize motor windings 23 and 20 through driver amplifiers not shown. The high state of 46-1 and 49-1 also enables 42-1, 45-3, 39-1, and 40-3. With the assumption that the digital computer has a raise mode selected, then inputs 39-2, 41-2, 43-2, and 45-2 are enabled. Now assume that the clock input, gated at a 30 pulse per second rate, is going to the clock input terminal 31. We now have triple inputs on the AND gates 45 and 39 which will gate the OR logic for OR gates 48 and 50.

This will lower output 49-1, raise output 49-2, and maintain output 46-1 in a high state. This de-energizes winding 20 and energizes winding 21 causing one step of the motor 1.8° and 1/2000 of scale change of the output voltage.

The Flip-Flop output 49-2 is also connected to AND gate inputs 41-3 and 38-1. With the inputs 41-3, 41-2 high the next clock pulse will cause output 46-2 to go high and 46-1 will go low causing the next step of 1.8°. This sequencing will continue as long as the raise contact is enabled and the pulse train is applied. The lower sequence is the reverse using the lower enable gate.

The controller has been described as a set point controller. However, it will be understood that the same controller is equally useful in direct digital control systems wherein the analog voltage output of the controller directly controls the primary control element. Other modifications are within the skill of the art. The appended claims are, therefore, intended to cover all such modifications within the true spirit and scope of the invention.

What is claimed is:

1. A control system comprising a plurality of analog control devices each responding to an analog control signal comprising:
   a digital computer responsive to inputs from said system, said computer producing a plurality of set point signals including a variable pulse width signal representative of a change in at least one of said inputs, and continuous raise or lower signals controlling the direction of control of each of the devices and persisting until a predetermined, desired adjustment is accomplished;
   a plurality of set point controllers, each of said set point controllers being responsive to one of said set point signals, each of said set point controllers including:
   an incremental step motor comprising a plurality of windings and a rotor, selective energization of the windings of said motor causing incremental rotation of the rotor of said motor;
   a potentiometer including a rotatable shaft coupled to said motor for producing an analog control signal as an output in response to rotation of the rotor of said motor;
   two bi-stable flip-flops each having two outputs and a set and a reset input, one output of each flip-flop being connected to one side of each of the windings of said motor, the other output of each flip-flop being connected to the other side of each of said motor windings, said variable pulse width signal being applied to energize said flip-flops only during the time duration of said pulse, each of said flip-flops being of the toggle type having two enable inputs and a toggle input,
   a source of clock pulses, the source in each set point controller being synchronized to the frequency of the same local line power, said source of clock pulses being applied to the toggle inputs of said flip-flops, and
   two AND gates connected through an OR gate to each of the set and reset inputs of each flip-flop, the output of said flip-flops being connected to the inputs of said AND gates to determine the switching sequence when said raise signal is present and in a second switching sequence when said lower signal is present, whereby the same pulse width signal produces the same analog control signal in different controllers because of the synchronization of each controller to the same line power frequency and because the same logic circuitry is used in both a raise and a lower sequence.

2. A control system comprising a plurality of analog control devices each responding to an analog control signal:
   a digital computer responsive to inputs from said system, said computer producing a plurality of set point signals including a variable pulse width signal representative of a change in at least one of said inputs, and continuous raise or lower signals controlling the direction of control of each of said control devices and persisting until a predetermined, desired adjustment is accomplished;
   a plurality of set point controllers, each of said set point controllers being responsive to one of said set point signals, each of said set point controllers including:
   an incremental step motor having a permanent magnet rotor, a permanent magnet stator and four motor windings, selective energization of said windings causing incremental rotation of a motor shaft connected to said rotor,
   a multiple turn potentiometer having a potentiometer shaft which positions a contact on a resistor to produce said analog control signal as an output in response to rotation of said potentiometer shaft,
   a direct fixed coupling without intervening gears and disposed between said motor shaft and said potentiometer shaft so that said potentiometer shaft rotates one revolution for each revolution of said motor shaft,
   idler gear means connected for rotation with said potentiometer shaft, and a manual adjustment knob having engaging means at one end thereof for selectively engaging said idler gear means to allow manual adjustment of said potentiometer,
   two bistable flip-flops each having two outputs and a set and reset input, one output of each flip-flop being connected to one side of each of said motor windings, the other output of each flip-flop being connected to the other side of each of said motor windings, said variable pulse width signal being applied to energize said flip-flops only during the time duration of said pulse, each of said flip-flops being of the toggle type having two enable inputs and a toggle input,
   a source of clock pulses, the source in each set point controller being synchronized to the frequency of the same local line power, said source of clock pulses being applied to the toggle inputs of said flip-flops, and
   two AND gates connect through an OR gate to each of the set and reset inputs of each flip-flop, the outputs of said flip-flops being connected to the inputs of said AND gates to determine the switching sequence when said raise signal is present and in a second switching sequence when said lower signal is present, whereby the same pulse width signal produces the same analog control signal in different controllers because of the synchronization of each controller to the same line power frequency and because the same logic circuitry is used in both a raise and a lower sequence.

* * * * *